United States Patent
Rasmussen et al.

(10) Patent No.: US 9,593,629 B2
(45) Date of Patent: Mar. 14, 2017

(54) METHOD AND SYSTEM FOR CONTROLLING AN AIR-FUEL RATIO IN AN ENGINE USING A FUEL SOURCE WITH AN UNKNOWN COMPOSITION

(71) Applicant: Caterpillar Inc., Peoria, IL (US)

(72) Inventors: Jason Jon Rasmussen, Hopewell, IL (US); Arvind Sivasubramanian, Peoria, IL (US); Venkat Vijay Kishore Turlapati, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 182 days.

(21) Appl. No.: 14/639,453

(22) Filed: Mar. 5, 2015

(65) Prior Publication Data

US 2016/0258379 A1    Sep. 8, 2016

(51) Int. Cl.
F02D 19/06    (2006.01)
F02D 35/02    (2006.01)
F02D 41/00    (2006.01)
F02D 19/08    (2006.01)

(52) U.S. Cl.
CPC ..... F02D 19/0642 (2013.01); F02D 19/0636 (2013.01); F02D 19/0647 (2013.01); F02D 19/0694 (2013.01); F02D 35/023 (2013.01); F02D 41/0002 (2013.01); F02D 41/0027 (2013.01); F02D 41/0025 (2013.01); F02D 2200/0612 (2013.01)

(58) Field of Classification Search
CPC .. F02D 41/26; F02D 41/0025; F02D 41/0027; F02D 19/0642; F02D 19/0647; F02D 19/0694; F02D 19/081

USPC .... 701/104, 103, 102, 101; 123/525, 27 GE, 123/526, 527, 575–578

See application file for complete search history.

(56) References Cited

U.S. PATENT DOCUMENTS

| 4,905,649 A | 3/1990 | Washino et al. |
| 8,733,298 B2 | 5/2014 | Haskara et al. |
| 2009/0064682 A1* | 3/2009 | Healy .................. F02C 7/22 60/772 |
| 2010/0126481 A1 | 5/2010 | Willi et al. |
| 2013/0046451 A1 | 2/2013 | Suzuki et al. |

* cited by examiner

*Primary Examiner* — Mahmoud Gimie
(74) *Attorney, Agent, or Firm* — Miller, Matthias & Hull LLP

(57) ABSTRACT

A method for controlling an air-fuel ratio (AFR) in an engine powered by a gaseous fuel having an unknown composition may comprise receiving an assumed gas species composition for the gaseous fuel, and determining an assumed lower heating value (LHV) for the assumed gas species composition. The method may further comprise determining a perceived lower heating value (LHV) for the gaseous fuel based on a perceived gas mass flow and a gas energy flow for the gaseous fuel, and updating the assumed gas species composition until the assumed LHV and the perceived LHV are aligned. The method may further comprise determining a desired AFR and an airflow necessary to provide the desired AFR using the aligned gas species composition and a desired lambda ($\lambda$), and adjusting an air system controller of the engine to provide the airflow.

20 Claims, 8 Drawing Sheets

METHOD AND SYSTEM FOR CONTROLLING AN AIR-FUEL RATIO IN AN ENGINE USING A FUEL SOURCE WITH AN UNKNOWN COMPOSITION

TECHNICAL FIELD

The present disclosure generally relates to multi-fuel engines, and more specifically, to systems and methods for controlling air-fuel ratios (AFRs) in multi-fuel engines when one of the fuels has an unknown composition.

BACKGROUND

A multi-fuel engine is an engine designed to combust multiple types of fuel with air in its operation. Multi-fuel engines may be desirable where cheaper and cleaner fuel sources, such as natural gas, are available as a primary fuel source but a secondary fuel (e.g., diesel) is desired for performance reasons or as a backup in the event of depletion of the primary fuel source. A dual fuel engine, for example, may be designed to run on either or both of diesel and natural gas as fuel at a range of relative ratios depending on performance requirements and availability of the fuel sources. In one implementation of a dual fuel engine, the engine may primarily run on natural gas with the diesel being used as an ignition source.

The relative air-fuel ratio, or lambda ($\lambda$), in a multi-fuel engine may be defined as the ratio of the actual air-to-fuel ratio (e.g., mass of air/total mass of fuel), AFR, to the stoichiometric air-fuel ratio, $AFR_{STOICH}$, which is the air-to-fuel ratio at stoichiometry where just enough air molecules are present to achieve complete combustion of all of the fuel molecules. In fuel rich mixtures (excess fuel), $\lambda$ is less than one, while in fuel lean mixtures (excess air), $\lambda$ is greater than one. In order to provide compliant emissions as well as to regulate engine performance, $\lambda$ in multi-fuel engines may be tightly controlled. However, in engines using natural gas as a fuel source, accurate control of $\lambda$ may be a challenge as the composition of natural gas may vary or may change with time. In particular, natural gas may include various combustible species such as methane ($CH_4$), ethane ($C_2H_6$), and propane ($C_3H_8$), as well as various gases such as nitrogen ($N_2$) and carbon dioxide ($CO_2$) that do not participate in the combustion process. For some applications, it may be cost-prohibitive to employ analytical techniques to determine the exact composition of the natural gas used in the engine.

U.S. Pat. No. 8,733,298 describes a method for determining a blend ratio of petrodiesel fuel and biodiesel fuel in a multi-fuel compression ignition engine. Specifically, the method uses an in-cylinder pressure sensor (ICPS) to calculate the heat released in the cylinder combined with the injected fuel quantity to estimate a lower heating value (LHV) for the fuel, which is then correlated with a percent biodiesel in the petrodiesel/biodiesel fuel mixture. While effective, further improvements that address multi-component fuels having compositions that vary with time, such as natural gas, are still wanting.

Clearly, there is a need for improved methods and systems capable of controlling air-fuel ratios in engines operating with a fuel source having an unknown composition.

SUMMARY

In accordance with one aspect of the present disclosure, a method for controlling an air-fuel ratio (AFR) in an engine powered by a gaseous fuel source having an unknown composition is disclosed. The method may comprise receiving an assumed gas species composition for the gaseous fuel, and determining an assumed lower heating value (LHV) for the assumed gas species composition. The method may further comprise determining a perceived lower heating value (LHV) for the gaseous fuel based on a perceived gas mass flow and a gas energy flow for the gaseous fuel, comparing the assumed LHV and the perceived LHV, and updating the assumed gas species composition until the assumed LHV and the perceived LHV are aligned. The assumed gas species composition may be an aligned gas species composition when the assumed LHV and the perceived LHV are aligned. The method may further comprise determining a desired AFR using the aligned gas species composition and a desired $\lambda$, determining an airflow necessary to provide the desired AFR, and adjusting an air system controller of the engine to provide the airflow.

In accordance with another aspect of the present disclosure, an engine powered by a gaseous fuel having an unknown composition is disclosed. The engine may comprise at least one cylinder having a combustion chamber disposed therein, a piston positioned for displacement within the cylinder, and an intake manifold configured to deliver a mixture of air and the gaseous fuel to the cylinder. The engine may further comprise an airflow controller configured to regulate an airflow in the intake manifold, and a gaseous fuel flow regulating device configured to regulate a gas mass flow in the intake manifold. In addition, the engine may further comprise an electronic control module (ECM) in electronic communication with the airflow controller and the gaseous fuel flow regulating device. The ECM may include an assumed gas species input control for allowing an input of an assumed gas species composition for the gaseous fuel, and a gas species estimation module. The gas species estimation module may be configured to determine an assumed lower heating value (LHV) for the assumed gas species composition, to determine a perceived lower heating value (LHV) for the gaseous fuel based on a perceived gas mass flow and a gas energy flow for the gaseous fuel, and to update the assumed gas species composition until the assumed LHV and the perceived LHV are aligned. The gas species estimation may provide an aligned gas species composition when the assumed LHV and the perceived LHV are aligned. In addition, the ECM may further include an airflow estimation module configured to determine a desired air-fuel ratio (AFR) and an airflow necessary to provide the desired AFR using the aligned gas species composition and a desired $\lambda$. The airflow estimation module may be further configured to send a command to the airflow controller to provide the airflow.

In accordance with another aspect of the present disclosure, a method for estimating a gas species composition for a gaseous fuel having an unknown composition in an engine powered by the gaseous fuel is disclosed. The method may comprise receiving an assumed gas species composition, determining an assumed lower heating value (LHV) for the assumed gas species composition, and determining a perceived lower heating value (LHV) for the gaseous fuel based on a perceived gas mass flow and a gas energy flow for the gaseous fuel. The method may further comprise comparing the assumed LHV and the perceived LHV, and updating the assumed gas species composition until the assumed LHV and the perceived LHV are aligned. The assumed gas species composition may be an approximation of the gas species composition when the assumed LHV and the perceived LHV are aligned.

These and other aspects and features of the present disclosure will be more readily understood when read in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use with a particular type of engine or type of fuel. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
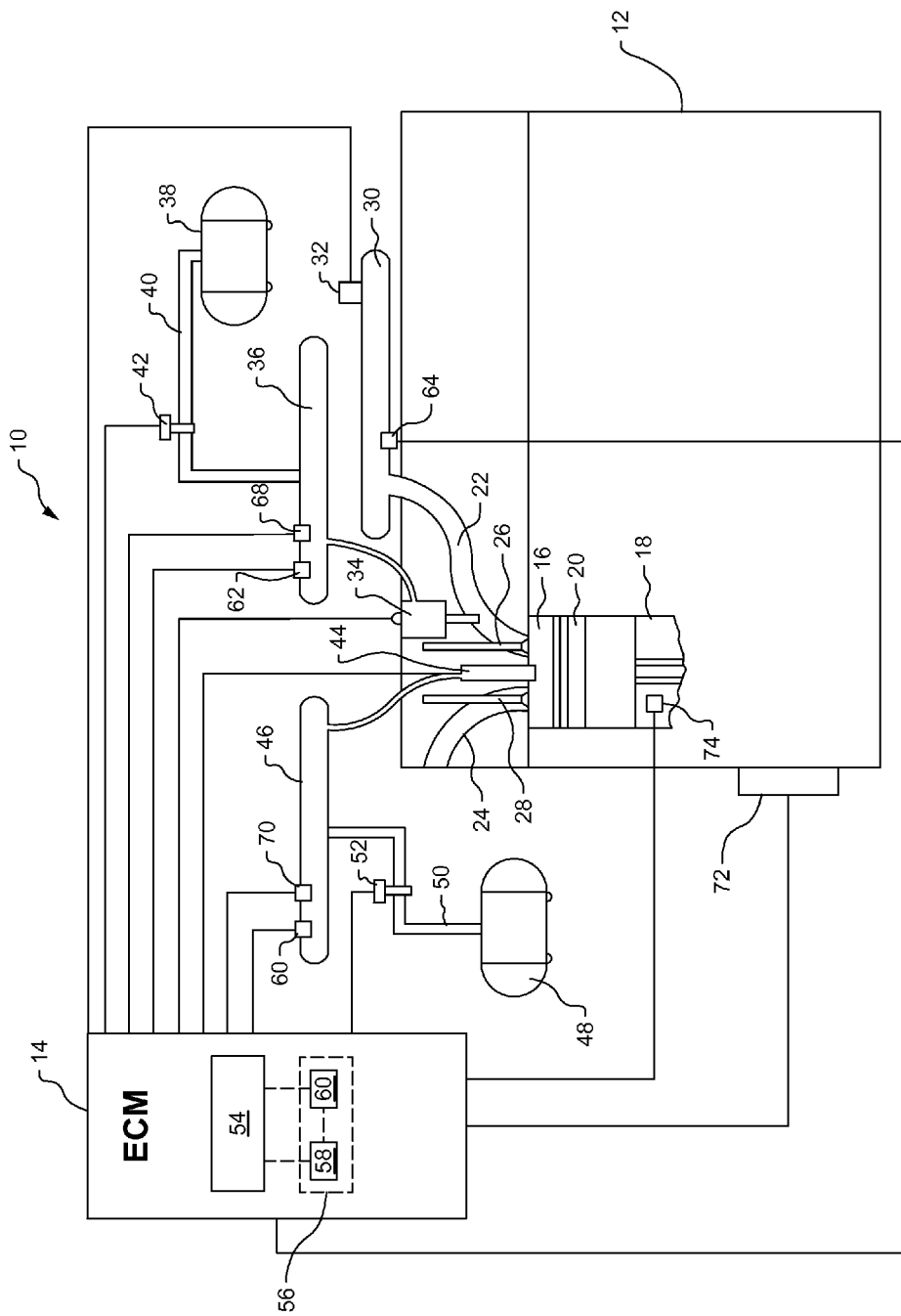
FIG. 1 is a schematic view of an exemplary multi-fuel engine system capable of running on a gaseous fuel source having an unknown composition, in accordance with the present disclosure.

Referring now to the drawings, and with specific reference to FIG. 1, an exemplary engine system 10 constructed in accordance with the present disclosure is shown. The engine system 10 may include an engine 12 and an electronic control module (ECM) 14 which may control the flow of air and fuel into the engine 12. Then engine 12 may be configured to operate in a multi-fuel mode during which two or more different types of fuel may provide power to the engine 12. One of the fuel sources may have an unknown composition or a composition that is changing with time. For example, the engine 12 may be a dual fuel engine that is powered by a primary gaseous fuel source having an unknown composition, such as natural gas, and a secondary liquid fuel source, such as diesel fuel. In this case, the engine 12 may be configured to run in dual fuel mode in which the gaseous fuel provides the majority of the power to the engine and the diesel fuel may be used as an ignition source to initiate combustion of a mixture of the gaseous fuel and air, although the engine 12 may be configured to run on all diesel fuel when the gaseous fuel supply is low, or on various relative fractions of diesel and gaseous fuel. Although the following description is largely focused on a dual fuel engine powered by a gaseous fuel source and diesel, it will be understood that the teachings of the present disclosure may be implemented in various types of engines in which one of the fuel sources has an unknown composition.

The engine 10 may include a combustion chamber 16 disposed in a cylinder 18, a piston 20 positioned for displacement within the cylinder 18, an intake port 22 configured to supply the combustion chamber 16 with a mixture of air and gaseous fuel (e.g., natural gas), an exhaust port 24, and an intake valve 26 and an exhaust valve 28 for regulating fluid communication between the cylinder 18 and the intake port 22 and the exhaust port 24, respectively. Although the engine 12 is shown with a single cylinder 18, it will be understood that the actual number of the cylinders 18 may vary and that the engine 12 could be of the in-line type, V-type, or rotary type.

The intake port 22 may receive air from an air intake manifold 30 which may include an airflow controller 32 for regulating air pressure within the intake manifold 30 and the intake port 22. In addition, a flow regulating device, such as a gaseous fuel admission valve 34, may be positioned between a gaseous fuel manifold 36 at an upstream side and the intake port 22 at a downstream side. A nozzle portion of the valve 34 may extend into the intake port 22 and deliver gaseous fluid thereto for mixing with air from the intake manifold 30 prior to the delivery of the air/gaseous fuel mixture to the cylinder 18. The gaseous fuel manifold 36 may be connected to a gaseous fuel source 38 by a fuel path 40, and a solenoid operated gaseous fuel shut-off valve 42 may be positioned along the fuel path 40. The gaseous fuel source 38 may provide a natural gas fuel that may contain various combustible constituents such as, but not limited to, methane, ethane, propane, butane, nitrogen, and/or carbon dioxide in various relative percentages, although other types of gaseous fuel may be provided as well.

The engine 12 may further include a flow regulating device for the secondary fuel, such as a fuel injector 44, that may inject liquid fuel (e.g., diesel fuel) into the combustion chamber 16. The liquid fuel may be provided to the fuel injector 44 from a common rail 46 that is supplied with fuel from a fuel source 48 via a fuel path 50. A solenoid operated shut off valve 52 may be positioned along the fuel path 50 to cut off the flow of diesel fuel if necessary.

The engine 12 may operate in a liquid fuel mode or in a dual fuel mode. In liquid fuel mode, the gaseous fuel admission valve 34 may remain closed while pressurized liquid fuel is injected into the cylinder 18 by the fuel injector 44 as the sole source of energy during combustion. In dual fuel mode, the gaseous fuel from the gaseous fuel source 38 may be discharged into the intake port 22 by the gaseous fuel admission valve 34 and may be mixed with air from the air intake manifold 30, while a small amount or pilot amount of the liquid fuel may be injected into the cylinder 18 by the fuel injector 44 in order to ignite the mixture of the air and the gaseous fuel in the combustion chamber 16. Alternate implementations of the system 10 may allow the engine 12 to be powered by additional fuels that may be available. In such implementations, additional fuel control valves/injectors, fuel sources, and shut-off valves may be provided to control the flow of the additional fuels.

The electronic control module (ECM) 14 of the engine system 10 may be in electronic communication with various components of the engine 12 and may control the apportionment of the fuel sources to the engine to provide the required power to the engine 12, as well as the air-fuel ratio (AFR) for combustion as will be described in more detail below. The ECM 14 may include a microprocessor 54 for executing specified programs that control and monitor various functions associated with the system 10. The microprocessor 54 may include a memory 56, such as a read only memory (ROM) 58 that may store a program or several programs, as well as a random access memory (RAM) 60 that may serve as a working memory area for use in executing the program(s) stored in the memory 56. Although the microprocessor 54 is shown, it is also possible to use other electronic components such as a microcontroller, an ASIC (application specific integrated circuit) chip, or any other integrated circuit device.

In order to monitor the performance of the engine 12, the ECM 14 may be in electronic communication with a gaseous fuel pressure sensor 62, an intake air pressure sensor 64, and a diesel fuel pressure sensor 66 via conductive paths capable of transmitting pressure indicative signals to the ECM 14. In addition, the ECM 14 may be in electronic connection with temperature sensors 68 and 70 provided in the gaseous fuel manifold 36 and the common rail 46, respectively, via conductive paths capable of transmitting temperature indicative signals to the ECM 14. The ECM 14 may also be in electronic communication with and may control each of the gaseous fuel admission valve 34, the fuel injector 44, and the air system controller 32 via conductive pathways. In this regard, the ECM 14 may be electrically connected to and may regulate various actuators for the fluid flow regulating devices of the engine 12, such as the gaseous fuel admission valve 34, the fuel injector 44, and the air system controller 32. The ECM 14 may include driver circuitry or software for delivering current control signals to the gaseous fuel admission valve 34, the fuel injector 44, and the air system controller 32 to control the flow rates/pressures of the corresponding fuel or air. However, it will also be understood that such driver circuitry could be implemented separate from, but connected to, the ECM 14.

Furthermore, the ECM 14 may also be in electronic communication with an engine speed sensor 72 which may be associated with a camshaft or other component of the engine 12, as well as an indicated mean effective pressure sensor (IMEP) 74 which may be positioned within the cylinder 18. The IMEP sensor 74 may detect the IMEP of the engine 12 and transmit signals representative of the engine's IMEP to the ECM 14. The IMEP may be determined from the in-cylinder pressure over the engine's combustion cycle, and may provide a measure of the energy released or work performed in the cylinder 18 over the engine's combustion cycle.

Figure 2:
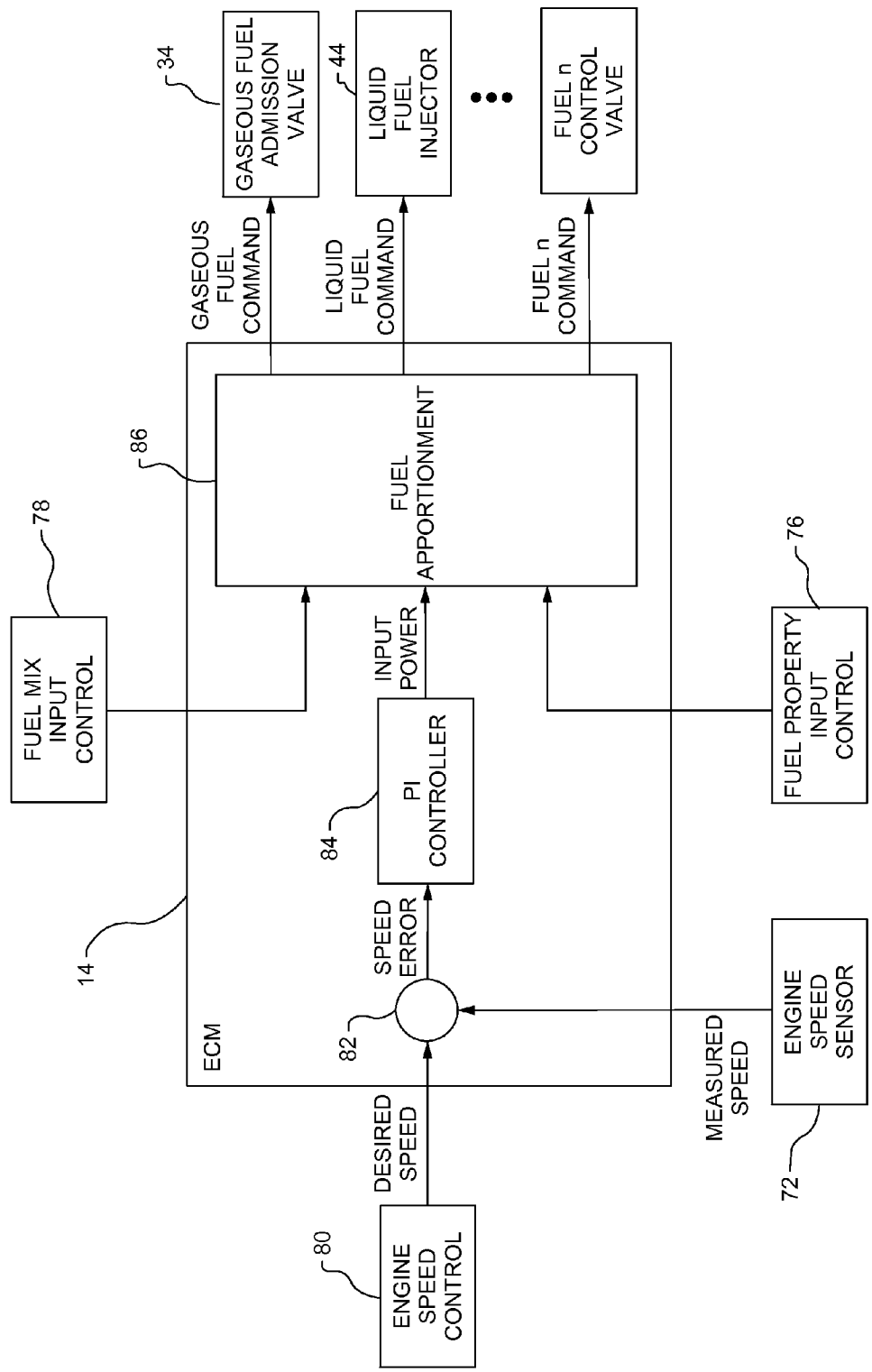
FIG. 2 is a schematic block diagram of a fuel apportionment control strategy implemented by an electronic control module (ECM) of the engine system of FIG. 1, in accordance with the present disclosure.

Referring now to FIG. 2, the ECM 14 may be used to implement a fuel apportionment strategy which may apportion fuels to the engine 12 according to the power needs of the engine 12 as well as fuel property data and fuel mix data provided at a fuel property input control 76 and a fuel mix input control 78. The fuel property input control 76 may be any appropriate input device (e.g., a computer terminal, remote computing device, external storage device connected to the ECM 14, etc.) allowing an operator, technician, or other user of the engine system 10 to input information regarding the properties of the fuels available for use by the system 10. Examples of fuel property data include the density or specific gravity (SG) for a fuel and a lower heating value (LHV) for a fuel which indicates an amount of energy released by the fuel per unit of mass or volume. Although well understood by those skilled in the art, an LHV for a fuel may be understood as the enthalpy of all combustion products, minus the enthalpy of the fuel at a reference temperature, minus the heat of vaporization of the vapor content of the combustion products. The fuel mix input control 78 may be any appropriate input device (e.g., a computer terminal, remote computing device, external storage device connected to the ECM 14) allowing an operator, technician, or other user of the multi-fuel engine system 10 to input information regarding the apportionment of the fuels available for use by the system 10. The fuel mix data input at the fuel mix input control 78 may specify the fuel substitution ratios (FSR), or fractions for usage of each of the available fuels, for meeting the input power necessary to operate the engine 12 at the engine speed specified at an engine speed control 80. The engine speed control 80 may be any type of input device (e.g., a gas pedal of a vehicle or excavating machine, a thrust lever of an airplane, etc.) allowing an operator to specify a desired speed at which the engine 12 should operate to perform a desired task. For example, in a dual fuel engine operating with natural gas and diesel, it may be desired to have the natural gas provide 80% of the power requirement and the diesel provide the remaining 20% of the power requirement, in which case a fuel substitution ratio of 0.80 may be input at the fuel mix input control 78. Where more fuels are available, a fuel substation ratio or fraction may be input for each available fuels in this way. To ensure that 100% of the input power requirement is provided by the fuels, the fuel mix input control 78 may be configured to restrict entry of the fuel substitution ratios of each of the available fuels, $FSR_i$, to those satisfying the equation:

$$\sum_{i=1}^{n} FSR_i = 1 \tag{1}$$

The fuel apportionment strategy may begin with an adder 82 of the ECM 14 that may compare a desired speed of the engine 12 input at the engine speed control 80 to a current measured speed of the engine 12 provided by the engine speed sensor 72. The adder 82 may subtract the measured speed of the engine 12 from the desired speed to arrive at a speed error. The speed error may occur due to a change in the commanded speed at the engine speed control 80, or due to a change in the actual speed of the engine 12 caused by an event such as a change in the load or torque of the engine 12. The speed error may be transmitted from the adder 82 to a proportional-integral (PI) controller 84 of the ECM 14. The PI controller 84 may be configured to use the speed error to determine an input power to be provided by the available fuels to cause the actual or measured engine speed to increase or decrease toward the desired engine speed.

A fuel apportionment module 86 of the ECM 14 may use the input power determined by the PI controller 84, along with data provided by the fuel property input control 76 and the fuel mix input control 78, to apportion the power demand between the available fuels. It is noted that prior to the fuel apportionment by the fuel apportionment module 86, the ECM 14 may assume that the engine 12 is operating on the secondary fuel source (e.g., diesel fuel). When the input power is transmitted to the fuel apportionment module 86 from the PI controller 84, the fuel apportionment module 86 may retrieve the fuel property and fuel mix data from the fuel property input control 76 and the fuel mix input control 78. The fuel apportionment module 86 may then use the fuel property and fuel mix data to determine a mass flow, $m_i$, for each fuel based on the following equation:

$$\dot{m}_i = \frac{FSR_i \times \text{Input Power}}{LHV_i} \quad (2)$$

where $FSR_i$ is the unitless FSR for the $i^{th}$ fuel, input power is the commanded power transmitted from the PI controller 84 having the units of energy per unit time, and $LHV_i$ is the lower heating value for the $i^{th}$ fuel having units of energy per unit mass. Thus, equation (2) yields $m_i$ in units of mass per unit time for each of the available fuels to provide the commanded power to the engine 12. After determining the mass flow for each of the available fuels, the fuel apportionment module 86 may format commands for the actuators of the fluid flow regulating devices (the gaseous fuel admission valve 34, the fuel injector 44, etc.) to cause the devices to provide the required mass flow, $m_i$, to the engine 12. In particular, the fuel apportionment module 86 may transmit a separate control signal to each of the fuel flow regulating devices to regulate the fuel mass flow therethrough. It is noted that the operation of the fuel apportionment strategy is also described in U.S. application Ser. No. 13/919,166.

Figure 3:
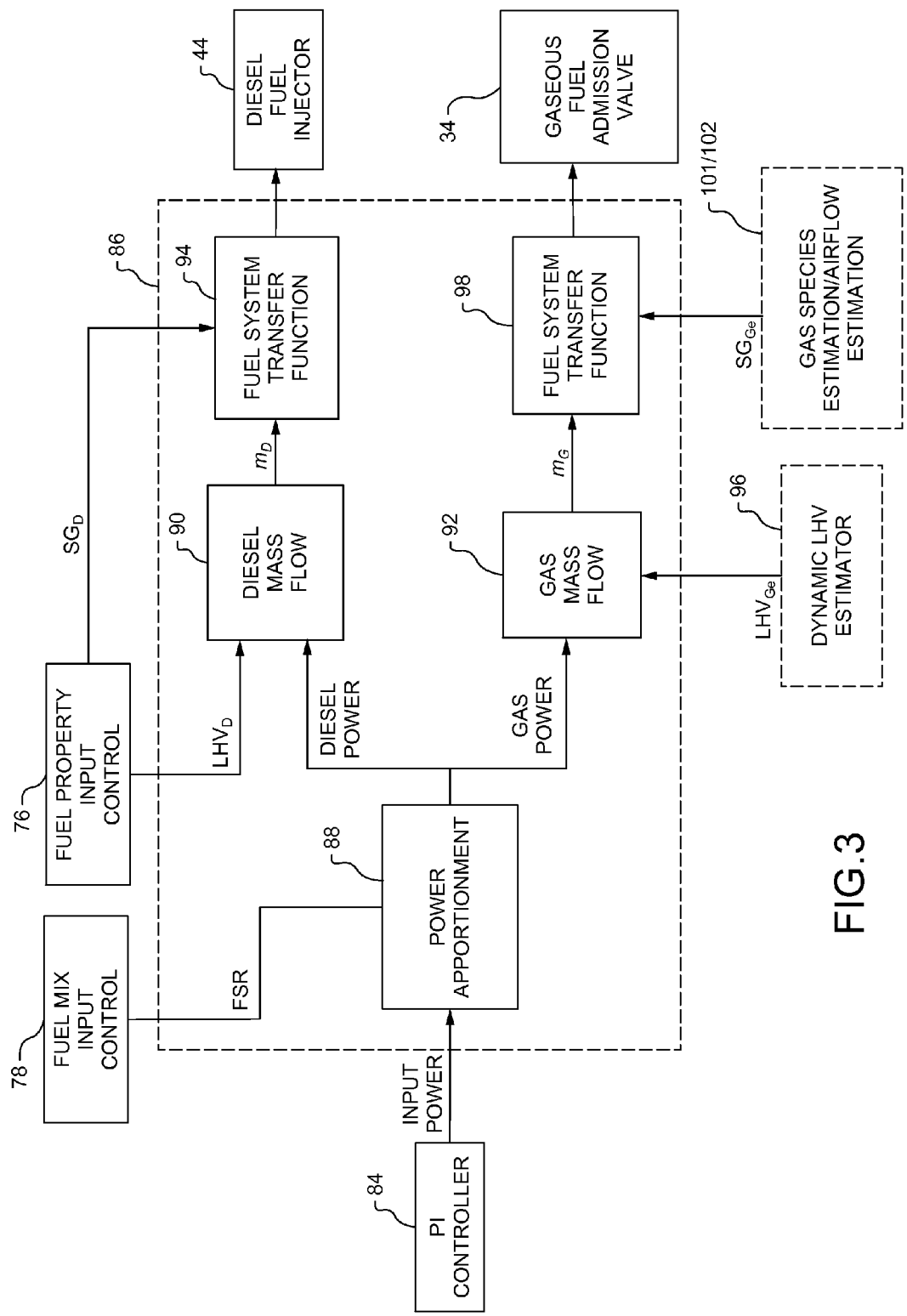
FIG. 3 is a schematic block diagram of an exemplary fuel apportionment module capable of implementing some of the functions of the fuel apportionment strategy of FIG. 2, in accordance with the present disclosure.

Further details of the fuel apportionment strategy as applied in a dual fuel engine powered by a gaseous fuel having an unknown composition (e.g., natural gas) and diesel fuel is shown in FIG. 3. The fuel apportionment module 86 may include a power apportionment module 88 that may receive the input power command from the PI controller 84 and the diesel/gaseous fuel FSR from the fuel mix input control 78. The power apportionment module 88 may then determine the amount of power to be provided by the diesel fuel (in units of energy per unit time) by multiplying the FSR for the diesel fuel by the input power, and may output a diesel power command to a diesel mass flow module 90. In addition, the power apportionment module 88 may also determine the amount of power to be provided by the gaseous fuel (in units of energy per unit time) by multiplying the FSR for the gaseous fuel by the input power requirement, and may output a gas power command to a gas mass flow module 92. The diesel mass flow module 90 may determine the diesel mass flow, $m_D$, based on the diesel power command and the lower heating value for the diesel fuel, $LHV_D$, as obtained from the fuel property input control 76, by dividing the diesel power command by $LHV_D$. In addition, the diesel mass flow module 90 may output a diesel mass flow, $m_D$, request to a diesel fuel system transfer function 94 which may control the fuel injector 44 for diesel to provide the requested diesel mass flow. Specifically, the fuel system transfer function 94 may control the diesel injection duration according to the requested diesel mass flow as well as the properties of the diesel fuel provided by the fuel property input control 76, such as the specific gravity of the diesel fuel ($SG_D$).

As the exact composition of the gaseous fuel may be unknown or changing with time, the lower heating value for the gaseous fuel may also be unknown. Thus, the gas flow module 92 may estimate the gas mass flow, $m_G$, using an estimated lower heating value for the natural gas ($LHV_{Ge}$) provided by a dynamic LHV estimator 96 as will be described in further detail below. A gas fuel system transfer function 98 may receive a gas mass flow ($m_G$) request from the gas mass flow module 92 and may regulate the gaseous fuel admission valve 34 accordingly to provide the requested gas mass flow. Specifically, the gas fuel system transfer function 98 may control the open duration of the gaseous fuel admission valve 34 based on the gas mass flow command as well as the properties of the gaseous fuel, such as the estimated specific gravity of the gaseous fuel ($SG_{Ge}$), provided by a gas species estimation module 101 and an airflow estimation module 102 which will be explained in further detail below. For example, if the gaseous fuel has a relatively low estimated specific gravity ($SG_{Ge}$), the fuel system transfer function 98 may specify longer open durations of the gaseous fuel admission valve 34 to provide the requested gas mass flow. The dynamic LHV estimator 96, the gas species estimation module 101, and the airflow estimation module 102 may be part of the ECM 14.

Figure 4:
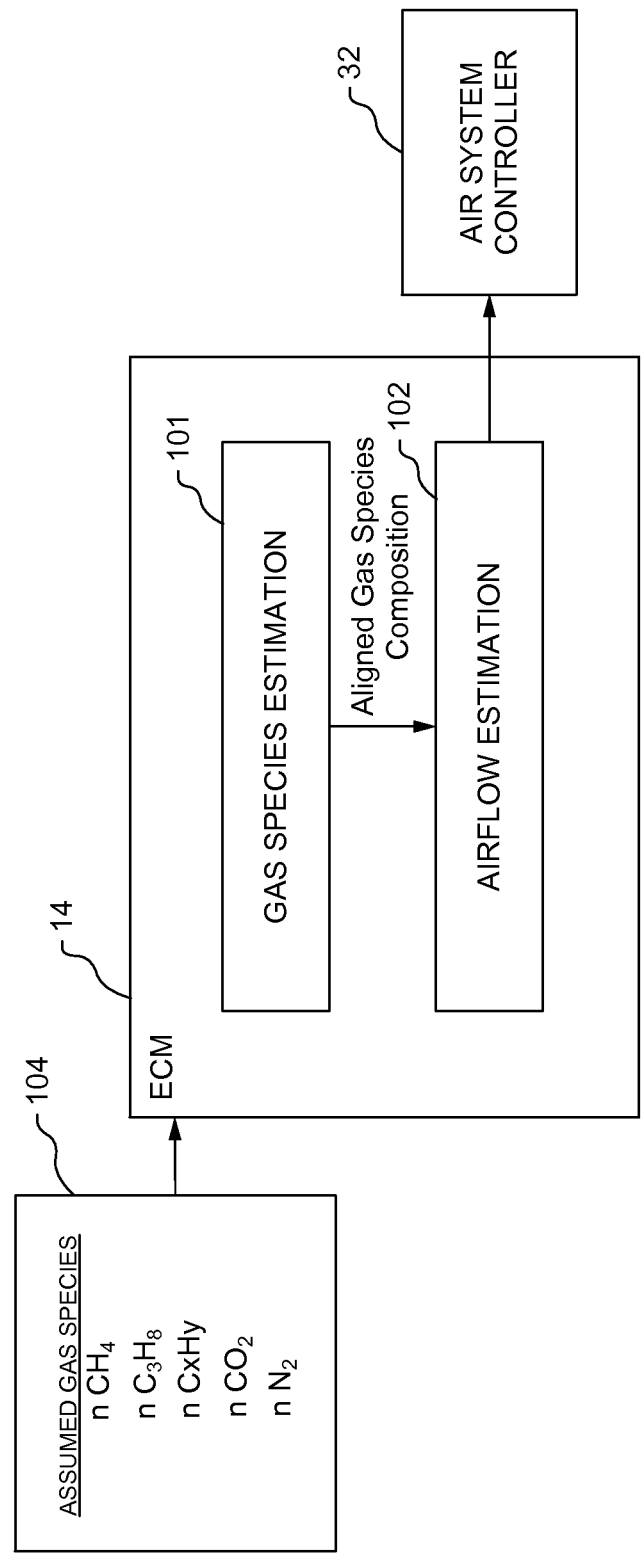
FIG. 4 is a schematic block diagram of a gas species estimation strategy and an air-fuel ratio (AFR) control strategy as implemented by the ECM, in accordance with the present disclosure.

A general overview of a gas species estimation strategy and an air-to-fuel ratio (AFR) control strategy as implemented by the ECM 14 when the engine 12 is running on an unknown gaseous fuel composition is shown in FIG. 4. The gas species estimation and AFR control strategy of the present disclosure allows the engine 12 to run on a controlled lambda ($\lambda$) even when the composition of the gaseous fuel is not precisely known. In general, the gas species estimation and AFR control strategy of the present disclosure may begin with an initial assumption or guess as to the gas species composition which may be input at an assumed gas species input control 104. The assumed gas species composition may be sent to the ECM 14 where the gas species estimation module 101 may optimize the estimation of the gas species composition based on gas energy flows derived from feedback from the IMEP sensor 74 as well as known energy flows for the secondary fuel. After a series of iterations, the gas species estimation module 101 may determine an aligned gas species composition which may be a more refined approximation of the actual gas species composition. The gas species estimation module 101 may then output the aligned gas species composition to the airflow estimation module 102. The airflow estimation module 102 may estimate an air-fuel ratio (AFR) necessary to provide a desired $\lambda$ based on the aligned gas species composition, and may determine the airflow in the intake port 22 necessary to provide the AFR. The airflow estimation module 102 may then send a command to the air system controller 32, causing the air system controller 32 to provide the commanded airflow.

Figure 5:
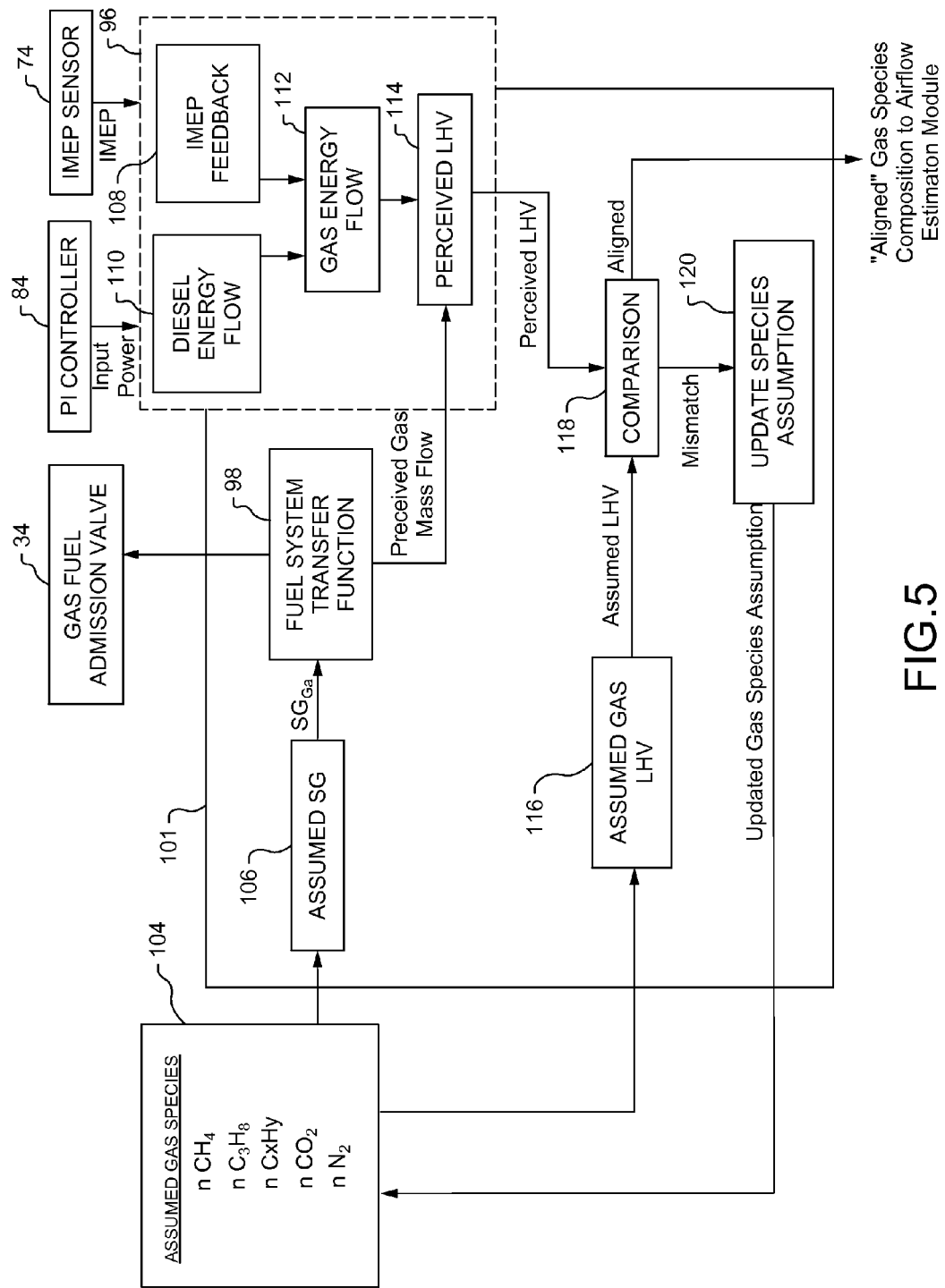
FIG. 5 is a schematic block diagram of the gas species estimation strategy as implemented by a gas species estimation module of the ECM, in accordance with the present disclosure.

The operation of the gas species estimation module 101 is shown in more detail in FIG. 5. An initial guess or assumption as to the gas species composition may be input at the assumed gas species input control 104. The assumed gas species input control 104 may be any appropriate input device (e.g., a computer terminal, remote computing device, etc.) that allows an operator, technician, or other user of the engine system 10 to input an initial guess of the gas species composition. Alternatively, the initial assumption of the gas species composition may be pre-programmed into the ECM 14 by an operator, technician or other user of the engine system 10. The assumed gas species composition may include initial estimates of the relative mole fractions (n) of possible species in the gaseous fuel, such as methane ($CH_4$), propane ($C_3H_8$), other hydrocarbon fuels ($C_xH_y$), as well as non-combustible gases such as carbon dioxide ($CO_2$) and nitrogen ($N_2$). Some implementations of gas species estimation module 101 may use a simplified model of the gaseous composition in which it is assumed that the gaseous fuel contains only a few constituents such as methane, propane, and carbon dioxide. More complex models may include additional constituents such as those listed above as well as others.

The assumed gas species input control 104 may then output the assumed gas species composition to an assumed SG module 106 of the gas species estimation module 101 which may calculate an assumed specific gravity for the gaseous fuel ($SG_{Ga}$) based on known properties of the assumed constituents of the gaseous fuel and their assumed relative mole fractions. The assumed SG module 106 may then output the $SG_{Ga}$ value to the gas fuel system transfer function 98 (also shown in FIG. 3 as the output of an estimated specific gravity ($SG_{Ge}$) for the gaseous fuel from the gas species estimation module 101). The fuel system transfer function 98 may then regulate the open duration of the gaseous fuel admission valve 34 according to the requested gas mass flow ($m_G$) and the $SG_{Ga}$ value to provide a perceived gas mass flow. It is noted that the perceived gas mass flow provided by the fuel system transfer function 98 is termed 'perceived' because the gas mass flow from the perspective of the fuel system transfer function 98 is based on an assumption as to the gas species composition and may deviate from the actual gas mass flow.

In addition, the dynamic LHV estimator 96 may be integrated with the gas species estimation module 101 and may include an IMEP feedback module 108 that may receive the IMEP from the IMEP sensor 74. The IMEP feedback module 108 may use the IMEP to determine an energy released in the cylinder 18 over the engine's combustion cycle. In addition, the dynamic LHV estimator 96 may also include a diesel energy flow module 110 that may determine a diesel energy flow based on input from the PI controller 84. As explained above, the PI controller 84 may operate under the assumption that the engine 12 is running on 100% diesel and that all of the input power needed to maintain a speed is provided by diesel fuel. Thus, the diesel energy flow module 110 may determine the quantity of diesel fuel needed to provide the input power specified by the PI controller 84, and may determine a diesel energy flow in units of energy by multiplying the diesel fuel quantity with the known $LHV_D$ of the diesel fuel.

The dynamic LHV estimator 96 may also include a gas energy flow module 112 that may receive input of the energy released in the cylinder over the combustion cycle from the IMEP feedback module 108, as well as input of the diesel energy flow from the diesel energy flow module 110. The gas energy flow module 112 may estimate the gas energy flow for the gaseous fuel based on the difference between the energy released in the cylinder and the diesel energy flow. In other words, as the input power may, in actuality, be provided by a combination of diesel fuel and gaseous fuel, any difference between the diesel energy flow that assumes the engine 12 is running on pure diesel and the measured energy released in the cylinder 18 may be attributed to the contribution of the gaseous fuel energy to the energy released in the cylinder.

A perceived LHV module 114 of the dynamic LHV estimator 96 may then determine a perceived LHV from the gas energy flow provided by the gas energy flow module 92 and the perceived gas mass flow provided by the fuel system transfer function 98. Specifically, the perceived LHV module 114 may determine the perceived LHV for the gaseous fuel using the equation:

$$\text{perceived LHV} = \text{gas energy flow/perceived gas mass flow} \quad (3)$$

wherein the gas energy flow is provided in units of energy per unit time, and the perceived mass flow is provided in mass per unit time to provide the perceived LHV in units of energy per unit mass. It is noted that the LHV determined by the perceived LHV module 114 is termed 'perceived' because it relies on the perceived gas mass flow which is based on an assumption of the gas species composition.

In addition, the gas species estimation module 101 may also include an assumed LHV module 116 that may calculate an assumed LHV for the gaseous fuel based on the assumed gas species composition input at the assumed gas species input control 104. In particular, the assumed LHV module 116 may calculate an assumed LHV for the gaseous fuel based on the ideal gas properties of the assumed species and their relative mole fractions according to relations apparent to those skilled in the art. A comparison module 118 of the gas species estimation module 101 may compare the perceived LHV from the dynamic LHV estimator 96 and the assumed LHV from the assumed LHV module 116. If the perceived LHV and the assumed LHV are mismatched, the comparison module 118 may output the mismatched energies to an update species assumption module 120 which may transmit an updated gas species assumption to the assumed gas species input control 104 according to known energy trends. For example, if the perceived LHV is lower than the assumed LHV, the update species assumption module 120 may increase the relative percentage of non-combustible gases (i.e., $CO_2$, $N_2$, etc.) which add mass to the fuel but do not contribute to the combustion energy (LHV) of the gaseous fuel. Alternatively, if the perceived LHV is higher than the assumed LHV, the update species assumption module 120 may increase the relative percentage of higher energy combustible gases (i.e., methane, propane, etc.) in the assumed gas species composition.

The feedback loop as described above may be repeated until the assumed LHV and the perceived LHV are matched or 'aligned' at which point the gas species estimation module 101 may settle on an 'aligned' gas species composition. The aligned gas species composition may be a near approximation of the actual gas species composition, and may deviate from the actual gas species composition by an error. It is also noted that the dynamic LHV estimator 96 may continually output the perceived LHV to the gas mass flow module 92 of the fuel apportionment module 86 as an estimated LHV for the gaseous fuel ($LHV_{Ge}$) during the repetitive iterations of the gas species estimation module 101 so that the gas flow module 92 may determine the gas mass flow, $m_G$ (see FIG. 3).

Figure 6:
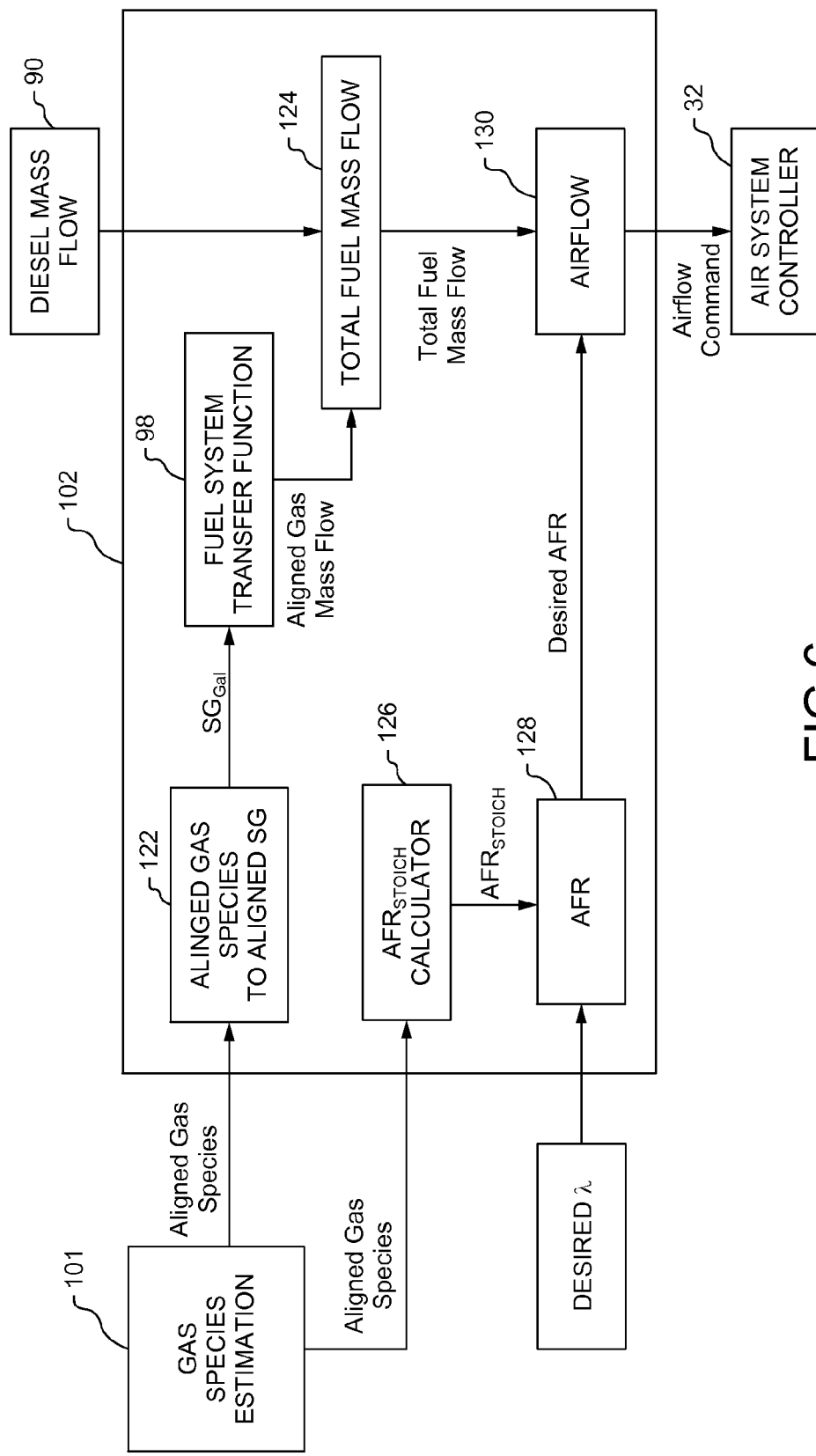
FIG. 6 is a schematic block diagram of the AFR control strategy as implemented by an airflow estimation module of the ECM, in accordance with the present disclosure.

Once settled on the aligned gas species composition, the gas species estimation module 101 may output the aligned gas species composition to the airflow estimation module 102 which may use the aligned gas species composition to determine the airflow required to achieve a desired λ. The airflow estimation module 102 is shown in greater detail in FIG. 6. An aligned SG module 122 may receive the aligned gas species composition from the gas species estimation module 101 and may use the aligned gas species composition to calculate an aligned specific gravity ($SG_{Gal}$) for the aligned gas species composition based on known properties of the constituents of the aligned composition and their relative mole fractions. The aligned SG module 122 may then output the $SG_{Gal}$ value to the gas fuel system transfer function 98 (also shown in FIG. 3 as the output of an estimated specific gravity ($SG_{Ge}$) for the gaseous fuel from the airflow estimation module 102), and the fuel system transfer function 98 may alter the open duration of the gaseous fuel admission valve 34 according to the requested gas mass flow ($m_G$) and the $SG_{Gal}$ value to provide an aligned gas mass flow. The aligned gas mass flow may still deviate from the actual gas mass flow as it is based on an approximation of the actual gas species composition. A total fuel mass flow module 124 may use the aligned gas mass flow provided by the fuel system transfer function 98 and the diesel mass flow, $m_D$, provided by the diesel mass flow module 90 of the fuel apportionment module 86 to provide an estimate for the total fuel mass flow.

In addition, the aligned gas species composition may be input to an $AFR_{STOICH}$ calculator 126 of the airflow estimation module 102 which may calculate a stoichiometric AFR ($AFR_{STOICH}$) for the aligned gas species composition. Specifically, the $AFR_{STOICH}$ calculator 126 may determine the air-fuel mass ratio at stoichiometry wherein exactly enough air is present to combust the aligned gas species composition, and not more. The $AFR_{STOICH}$ determined by the AFR STOICH calculator 126 may then be output to an AFR module 128 which may estimate a desired AFR using the $AFR_{STOICH}$ and a desired λ. The desired λ may be input into the ECM 14 by a technician, operator, or other user during initial calibration of the engine 12 based on the λ value that provides optimal or suitable performance and emissions. As λ is defined as the ratio of AFR to $AFR_{STOICH}$ (AFR/$AFR_{STOICH}$), the AFR module 128 may determine the AFR by equation (4) below.

$$AFR = \lambda * AFR_{STOICH} \quad (4)$$

The AFR module 128 may output the AFR to an airflow estimation module 130, and the total fuel mass flow module 124 may output the total fuel mass flow to the airflow estimation module 130. As the AFR is the mass ratio of air to fuel, the airflow estimation module 130 may determine the airflow necessary to provide the desired AFR based on equation (5) below.

$$airflow = AFR * total\ fuel\ mass\ flow \quad (5)$$

The airflow estimation module 130 may then send an airflow command to the air system controller 32 to cause the air system controller 32 to alter the pressure in the intake manifold 30 such that the airflow necessary to provide the desired λ is delivered to the cylinder 18 via the intake port 22. Notably, the airflow estimation strategy of the airflow estimation module 102 may result in a residual error that is present in both the AFR and the $AFR_{STOICH}$ as both values are based on approximations of the gas species composition. However, since $\lambda = AFR/AFR_{STOICH}$, the errors cancel out allowing a correct estimation of λ to be used for the airflow controller without knowing the exact composition of the gaseous fuel.

Figure 7:
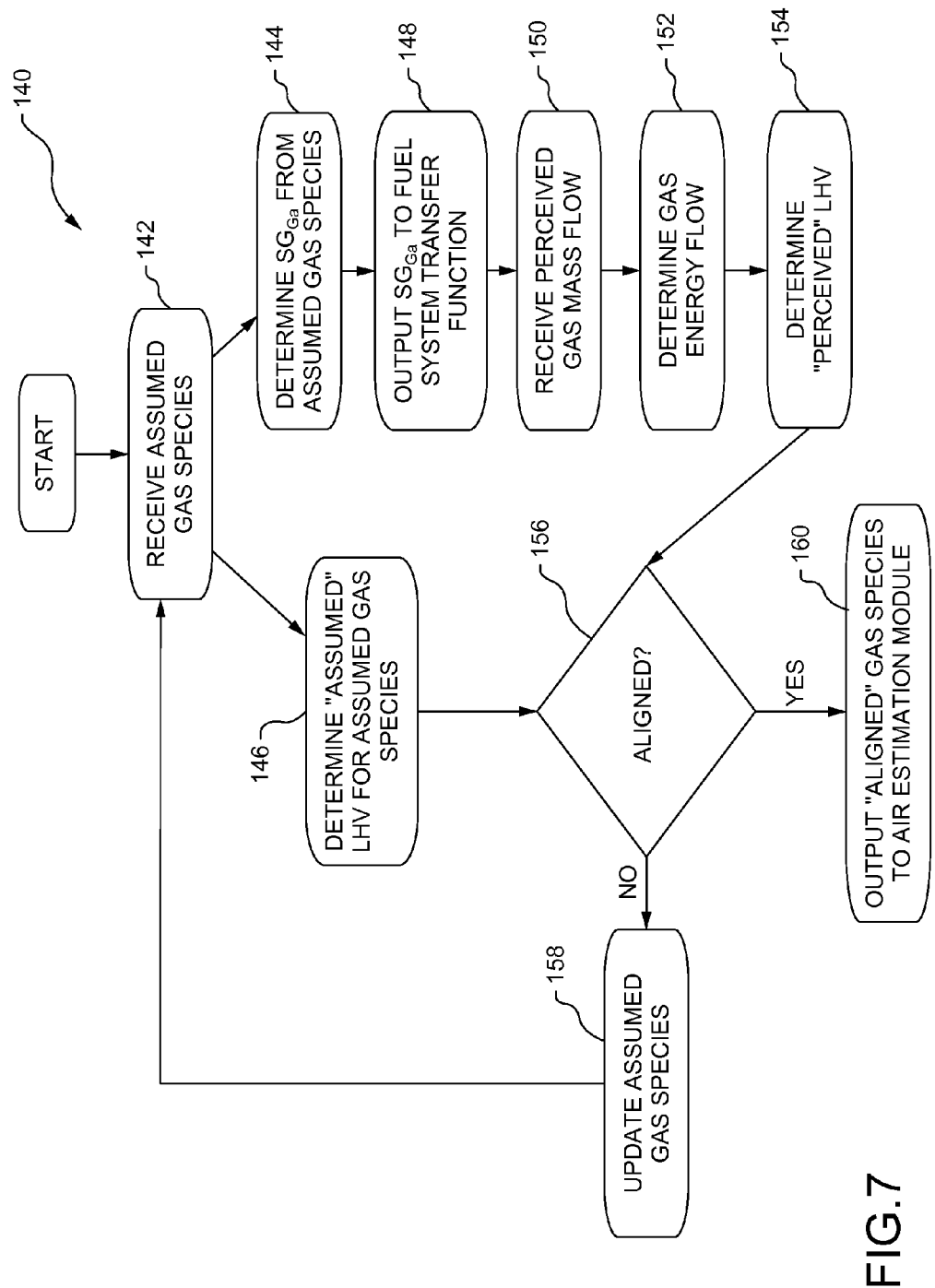
FIG. 7 is a flowchart of an exemplary method for estimating a gas species composition in the multi-fuel engine when running on an unknown gaseous fuel composition, in accordance with a method of the present disclosure.

FIG. 7 shows a method 140 for estimating a gas species composition in the engine 12 when running on an unknown gaseous fuel composition. In the method 140, the engine 12 may be powered by two fuel sources such as a primary gaseous fuel source (e.g., natural gas) having an unknown composition and a secondary liquid fuel source (e.g., diesel). It will be understood that the method 140 may be implemented by the gas species estimation module 101 as described in detail above. The method 140 may begin with a block 142 where an initial assumed gas species composition is received from the assumed gas species input control 104. The assumed gas species composition may be used to determine an assumed specific gravity ($SG_{Ga}$) for the assumed gaseous species according to a block 144. In addition, the assumed gas species composition may also be used to determine an assumed LHV according to a block 146. As explained above, the blocks 144 and 146 may be achieved by correlating the assumed gas species composition with an SG and an LHV using the known chemical properties of the assumed species and their relative mole fractions. The $SG_{Ga}$ value may then be output to the gas fuel system transfer function 98 according to a block 148, and the gas fuel system transfer function 98 may alter the open duration of the gaseous fuel admission valve 34 according to the $SG_{Ga}$ value to provide a perceived gas mass flow. The perceived gas mass flow may be received from the fuel apportionment module 86 according to a next block 150.

The gas energy flow for the gaseous fuel may then be determined according to a block 152 as a difference between an energy released in the cylinder over the engine's cycle (as obtained from the IMEP sensor 74) and the diesel energy flow determined based on the assumption that the engine 12 is running on pure diesel. A 'perceived' LHV for the gaseous fuel may then be determined according to a next block 154. As explained above, the blocks 152 and 154 may be performed using the dynamic LHV estimator 96, wherein the perceived LHV for the gaseous fuel is determined according to equation (3). The perceived LHV may then be compared with the assumed LHV according to a next block 156. If the perceived LHV and the assumed LHV are mismatched (or not aligned), the assumed gas species composition may be updated based on the energy difference between the two LHV values according to a next block 158. The blocks as described above may be repeated until the assumed and perceived LHVs are aligned, at which point the aligned gas species composition may be output to the airflow estimation module 102 according to a next block 160.

Figure 8:
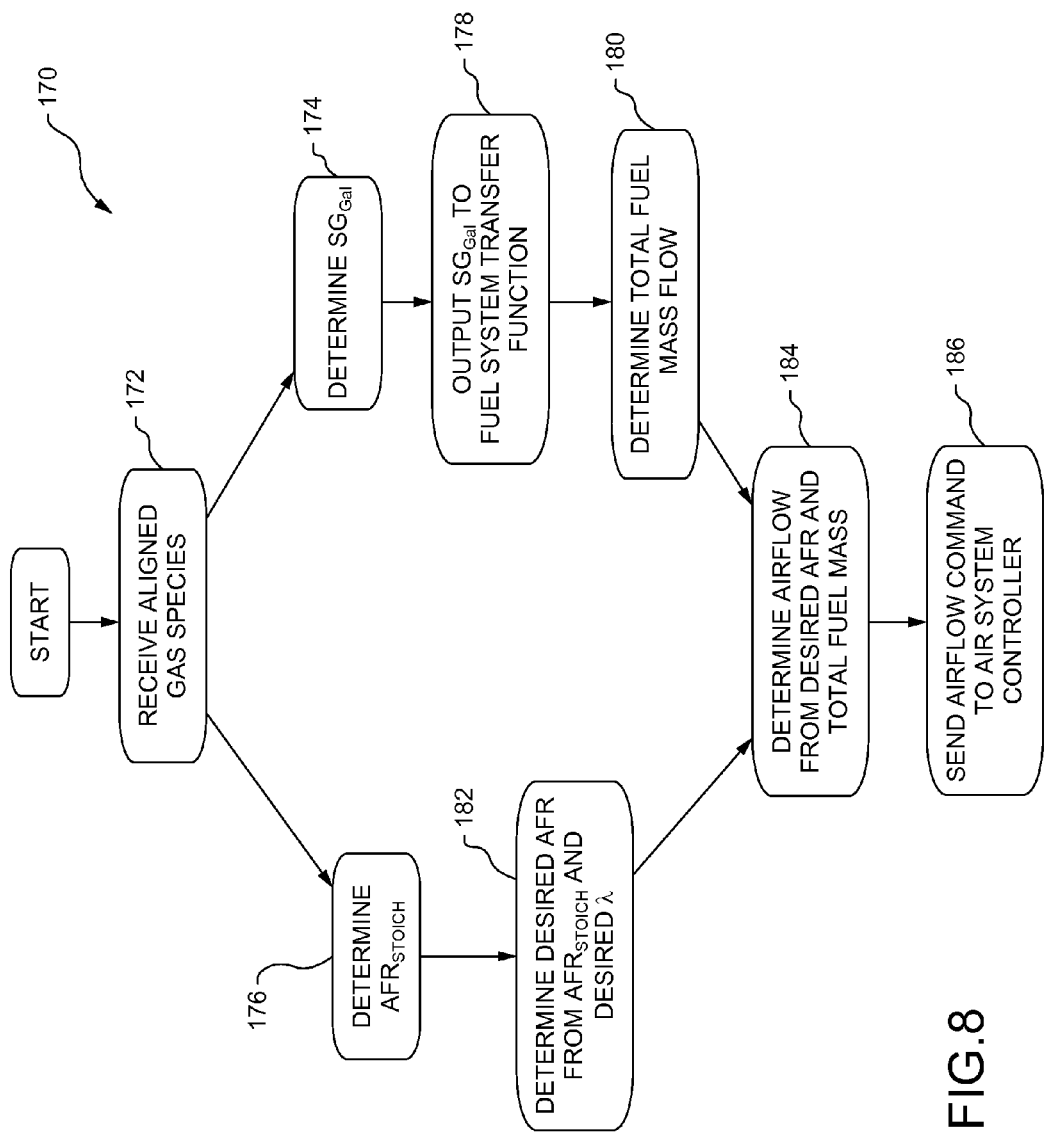
FIG. 8 is a flowchart of an exemplary method for controlling an AFR ratio in the multi-fuel engine when running on an unknown gaseous fuel composition, in accordance with a method of the present disclosure.

Turning now to FIG. 8, a method 170 for controlling the AFR in the engine 12 when running on an unknown gaseous fuel composition is shown. The method 170 may be implemented by the airflow estimation module 102 and may proceed after an aligned gas species composition is obtained according to the method 140 of FIG. 7. Beginning with a block 172, the aligned gas species composition may be received. The aligned gas species composition may then be used to determine an aligned specific gravity ($SG_{Gal}$) and an $AFR_{STOICH}$ for the aligned gas species composition according to blocks 174 and 176, respectively, using known chemical relations. According to a block 178, the aligned specific gravity ($SG_{Gal}$) may then be output to the gas fuel system transfer function 98 so that the fuel system transfer function 98 may alter the open duration of the gaseous fuel admission valve 34 to provide an aligned gas mass flow. The aligned gas mass flow, provided by the fuel system transfer function 98, and the diesel mass flow ($m_D$), provided by the diesel mass flow module 90, may be summed to provide a total fuel mass flow according to a next block 180, as shown.

The $AFR_{STOICH}$, determined by the block 176, and a desired λ value input into the ECM 14 during the calibration of the system 10 may then be used to determine a desired AFR according to equation (4) described above (block 182). The desired AFR and the total fuel mass flow determined by the blocks 182 and 180, respectively, may then be used to determine the airflow necessary to provide the desired AFR according to equation (5) described above (block 184). According to a next block 186, an airflow command may be sent to the air system controller 32 to cause the air system controller 32 to adjust the air pressure in the intake manifold 30 accordingly. It will be understood that, in practice, the method 140 of FIG. 7 as performed by the gas species estimation module 101, and the method 170 of FIG. 8 as performed by the airflow estimation module 102 may run simultaneously such that the modules 101 and 102 may track together as the gaseous fuel properties change.

INDUSTRIAL APPLICABILITY

The teachings of the present disclosure may find industrial applicability in a variety of settings such as, but not limited to, multi-fuel engines operating on a gaseous fuel source having an unknown composition. The technology disclosed herein provides an approximation of a gaseous fuel source composition as the engine is running to permit regulation of $\lambda$, even when the composition of the gaseous fuel source is not exactly known. The strategy of the present disclosure starts with an initial guess or assumption as to the composition of the gaseous fuel. From this assumption, the properties (specific gravity, LHV) of the gaseous fuel may be calculated. The specific gravity of the assumed gas species composition may then be sent to a fuel system transfer function to calibrate the gaseous fuel admission valve accordingly to provide a perceived mass flow. While the engine is running, the energy flow in the gaseous fuel may be estimated from feedback from an IMEP sensor in the engine cylinder, and a diesel energy flow determined based on the assumption that the engine is running on pure diesel. From the gas energy flow and the perceived mass flow for the gaseous fuel, an LHV for the gaseous fuel may be estimated as a 'perceived' LHV. The LHV from the IMEP feedback loop may then be compared with the LHV for the assumed gas species composition, and the assumed gas species composition may be updated accordingly until the two LHVs are aligned. Once matched, the aligned gas species composition may be used to determine an $AFR_{STOICH}$ and an AFR based on a desired $\lambda$. Both the $AFR_{STOICH}$ and the AFR may have a residual error due to any error in the assumed species composition. However, since $\lambda=AFR/AFR_{STOICH}$, the errors may cancel out, allowing a correct estimation of $\lambda$ to be used for the airflow control system, even without knowing the exact composition for the gaseous fuel. It is expected that the technology disclosed herein may find wide industrial applicability in a wide range of areas such as, but not limited to, automotive and aerospace applications, power generation applications, and fuel extraction applications.

What is claimed is:

1. A method for controlling an air-fuel ratio (AFR) in an engine powered by a gaseous fuel having an unknown composition, the engine including a microprocessor adapted to perform the method, said method comprising:
    receiving an assumed gas species composition for the gaseous fuel;
    determining an assumed lower heating value (LHV) for the assumed gas species composition;
    determining a perceived lower heating value (LHV) for the gaseous fuel based on a perceived gas mass flow and a gas energy flow for the gaseous fuel;
    comparing the assumed LHV and the perceived LHV;
    updating the assumed gas species composition until the assumed LHV and the perceived LHV are aligned, the assumed gas species composition being an aligned gas species composition when the assumed LHV and the perceived LHV are aligned;
    determining a desired AFR using the aligned gas species composition and a desired $\lambda$;
    determining an airflow necessary to provide the desired AFR; and
    adjusting an air system controller of the engine to provide the airflow.

2. The method of claim 1, further comprising:
    determining an assumed specific gravity for the assumed gas species composition; and
    adjusting a gaseous fuel flow regulating device according to a requested gas mass flow for the gaseous fuel and the assumed specific gravity so that the gaseous fuel admission valve provides the perceived gas mass flow.

3. The method of claim 2, wherein the perceived LHV is obtained by dividing the gas energy flow by the perceived gas mass flow.

4. The method of claim 3, wherein the engine is a multi-fuel engine powered by the gaseous fuel and at least one secondary fuel source, and wherein the method further comprises determining the gas energy flow from a difference between an energy released in a cylinder of the multi-fuel engine and an energy flow of the secondary fuel, the energy flow of the secondary fuel being determined based on an assumption that the multi-fuel engine is powered solely by the secondary fuel.

5. The method of claim 4, wherein the energy released in the cylinder of the multi-fuel engine is determined based on input from an indicated mean effective pressure (IMEP) sensor in the cylinder.

6. The method of claim 5, wherein determining a desired AFR using the aligned gas species composition and a desired $\lambda$ comprises:
    determining a stoichiometric air-fuel ratio ($AFR_{STOICH}$) for the aligned gas species composition; and
    determining the desired AFR from the desired $\lambda$ and the $AFR_{STOICH}$.

7. The method of claim 6, wherein determining an airflow necessary to provide the desired AFR comprises determining the airflow from the desired AFR and a total fuel mass flow.

8. The method of claim 7, further comprising:
    determining an aligned specific gravity for the aligned gas species composition; and
    adjusting the gaseous fuel admission valve according to the requested gas mass flow for the gaseous fuel and the aligned specific gravity so that the gaseous fuel admission valve provides an aligned gas mass flow.

9. The method of claim 8, further comprising determining the total fuel mass flow from the aligned gas mass flow and a mass flow of the secondary fuel.

10. An engine powered by a gaseous fuel having an unknown composition, comprising:
    at least one cylinder having a combustion chamber disposed therein;
    a piston positioned for displacement within the cylinder;
    an intake port configured to deliver a mixture of air and the gaseous fuel to the cylinder;
    an airflow controller configured to regulate an airflow in the intake port;
    a gaseous fuel flow regulating device configured to regulate a gas mass flow in the intake port;
    an electronic control module (ECM) in electronic communication with the airflow controller and the gaseous fuel flow regulating device, the ECM including
        an assumed gas species input control for allowing an input of an assumed gas species composition for the gaseous fuel,
        a gas species estimation module configured to determine an assumed lower heating value (LHV) for the assumed gas species composition, to determine a perceived lower heating value (LHV) for the gaseous fuel based on a perceived gas mass flow and a gas energy flow for the gaseous fuel, and to update the assumed gas species composition until the assumed LHV and the perceived LHV are aligned, the gas species estimation module providing an aligned gas species composition when the assumed LHV and the perceived LHV are aligned, and
        an airflow estimation module configured to determine a desired air-fuel ratio (AFR) and an airflow necessary to provide the desired AFR using the aligned gas species composition and a desired λ, the airflow estimation module being further configured to send a command to the airflow controller to provide the airflow.

11. The engine of claim 10, wherein the gas species estimation module is further configured to determine an assumed specific gravity for the gaseous fuel based on the assumed gas species composition.

12. The engine of claim 11, wherein the ECM further includes a fuel system transfer function configured to adjust the gaseous fuel flow regulating device according to a requested gas mass flow for the gaseous fuel and the assumed specific gravity so that the gaseous fuel flow regulating device provides the perceived gas mass flow.

13. The engine of claim 12, wherein the engine further comprises an indicated mean effective pressure (IMEP) sensor associated with the cylinder and in electronic communication with the ECM, and wherein the IMEP sensor is configured to output a signal indicative of an energy released in the cylinder.

14. The engine of claim 13, wherein the engine is a multi-fuel engine powered by the gaseous fuel and at least on secondary fuel source, and wherein the gas species estimation module is further configured to determine the gas energy flow for the gaseous fuel based on a difference between the energy released in the cylinder and an energy flow of the secondary fuel, the energy flow of the secondary fuel being determined based on an assumption that the multi-fuel engine is powered solely by the secondary fuel.

15. The engine of claim 14, wherein the airflow estimation module is further configured determine a stoichiometric AFR ($AFR_{STOICH}$) for the aligned gas species composition.

16. The engine of claim 15, wherein the airflow estimation module is further configured to determine the desired AFR based on the desired λ and the $AFR_{STOICH}$.

17. The engine of claim 16, wherein the airflow estimation module is further configured to determine an aligned specific gravity for the gaseous fuel based on the aligned gas species composition and to output the aligned specific gravity to the fuel system transfer function, and wherein the fuel system transfer function is further configured to adjust the gaseous fuel flow regulating device based on the requested gas mass flow and the aligned specific gravity so that the gaseous fuel flow regulating device provides an aligned gas mass flow to the intake port.

18. The engine of claim 17, wherein the airflow estimation module is further configured to determine a total fuel mass flow from the aligned gas mass flow and a mass flow for the secondary fuel.

19. The engine of claim 18, wherein the airflow estimation module is further configured to determine the airflow based on the total fuel mass flow and the desired AFR.

20. A method for estimating a gas species composition for a gaseous fuel having an unknown composition in an engine powered by the gaseous fuel, comprising:
receiving an assumed gas species composition;
determining an assumed lower heating value (LHV) for the assumed gas species composition;
determining a perceived lower heating value (LHV) for the gaseous fuel based on a perceived gas mass flow and a gas energy flow for the gaseous fuel;
comparing the assumed LHV and the perceived LHV; and
updating the assumed gas species composition until the assumed LHV and the perceived LHV are aligned, the assumed gas species composition being an approximation of the gas species composition when the assumed LHV and the perceived LHV are aligned.

* * * * *